United States Patent [19]

Farrugia et al.

[11] Patent Number: 5,625,791
[45] Date of Patent: Apr. 29, 1997

[54] CHIP CARD WITH DATA AND PROGRAMS PROTECTED AGAINST AGEING

[75] Inventors: Augustin Farrugia, La Ciotat; François Geronimi, Aix en Provence, both of France

[73] Assignee: Gemplus Card International, Gemenos, France

[21] Appl. No.: 170,516

[22] Filed: Dec. 20, 1993

[30] Foreign Application Priority Data

Dec. 31, 1992 [FR] France .................................. 92 15992

[51] Int. Cl.$^6$ .................................................. G06F 12/16
[52] U.S. Cl. .................... 395/433; 395/430; 235/492; 365/222
[58] Field of Search ........................ 395/400, 425, 395/430, 442, 433; 365/222, 185, 185.33; 235/380, 492

[56] References Cited

U.S. PATENT DOCUMENTS

| 4,956,795 | 9/1990 | Yamaguchi et al. | 364/571.03 |
| 5,051,953 | 9/1991 | Kitazawa et al. | 365/185 |
| 5,365,486 | 11/1994 | Schreck | 365/222 |

FOREIGN PATENT DOCUMENTS

| 0358277 | 9/1989 | European Pat. Off. . |
| 0457310 | 5/1991 | European Pat. Off. . |

*Primary Examiner*—Eddie P. Chan
*Assistant Examiner*—Hiep T. Nguyen
*Attorney, Agent, or Firm*—Nilles & Nilles, S.C.

[57] ABSTRACT

In chip cards comprising non-volatile electrically erasable and programmable memories, to avoid the risks due to an ageing of the EEPROM memories, there is provided a procedure for the automatic refreshing of the contents of certain zones of the memory. The refreshing can take place at predetermined time intervals or at the end of a predetermined number of uses or routinely, whenever the card is powered, when the refresh operation relates to only one part of a zone, the address of this part being obtained by means of a random generator.

23 Claims, 2 Drawing Sheets

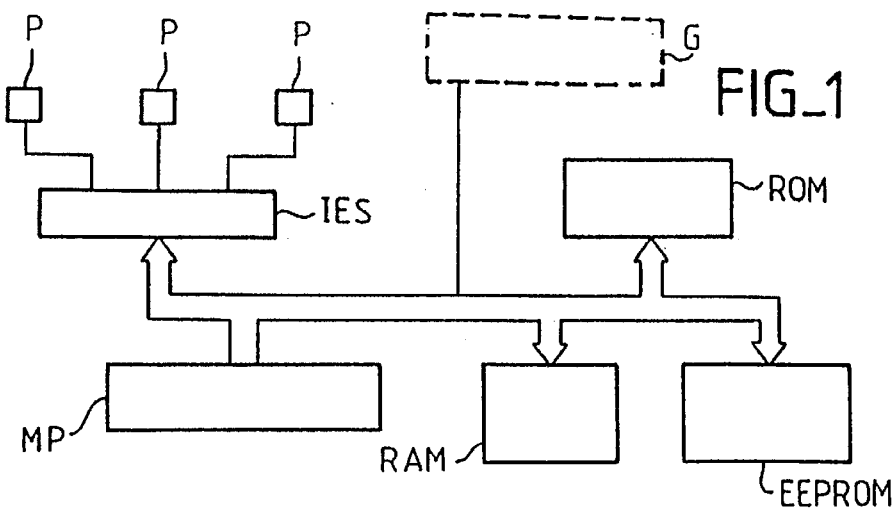
FIG_1
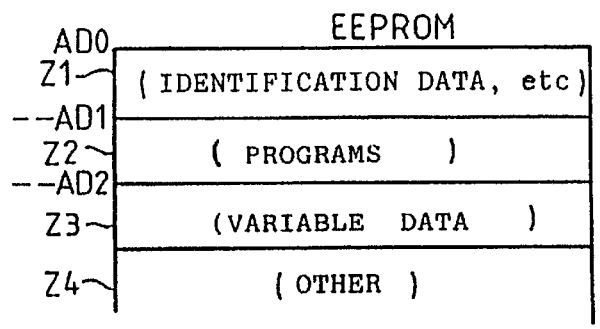
FIG_2
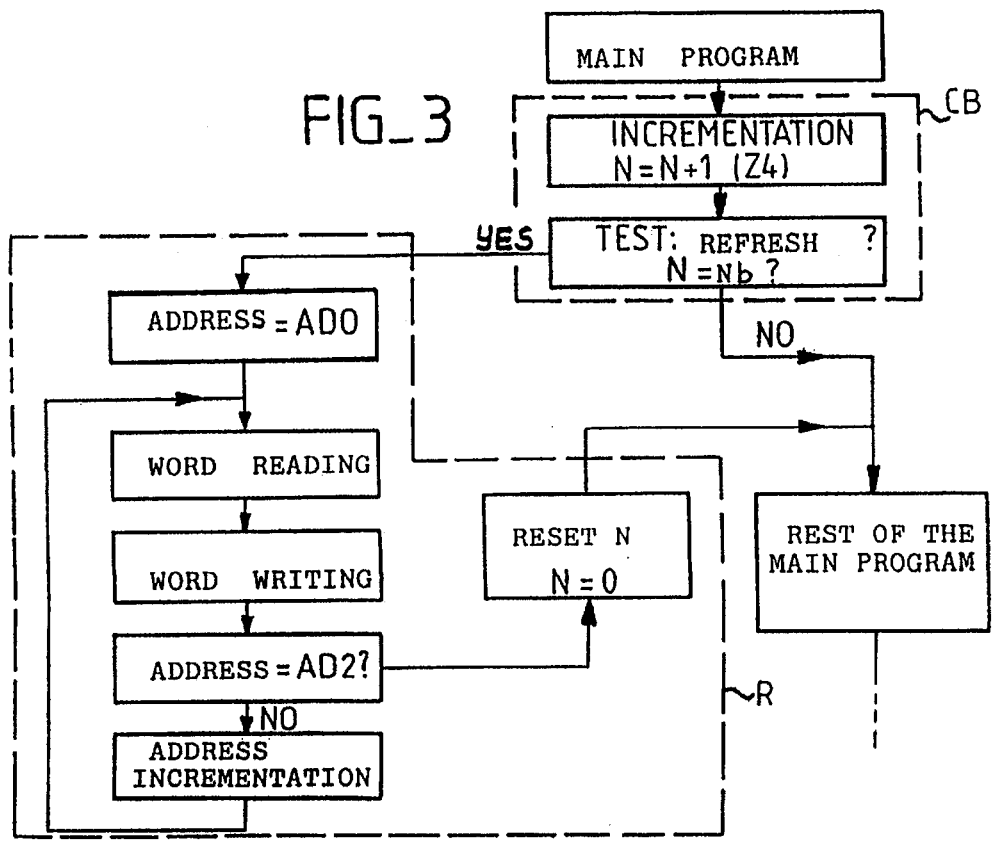
FIG_3

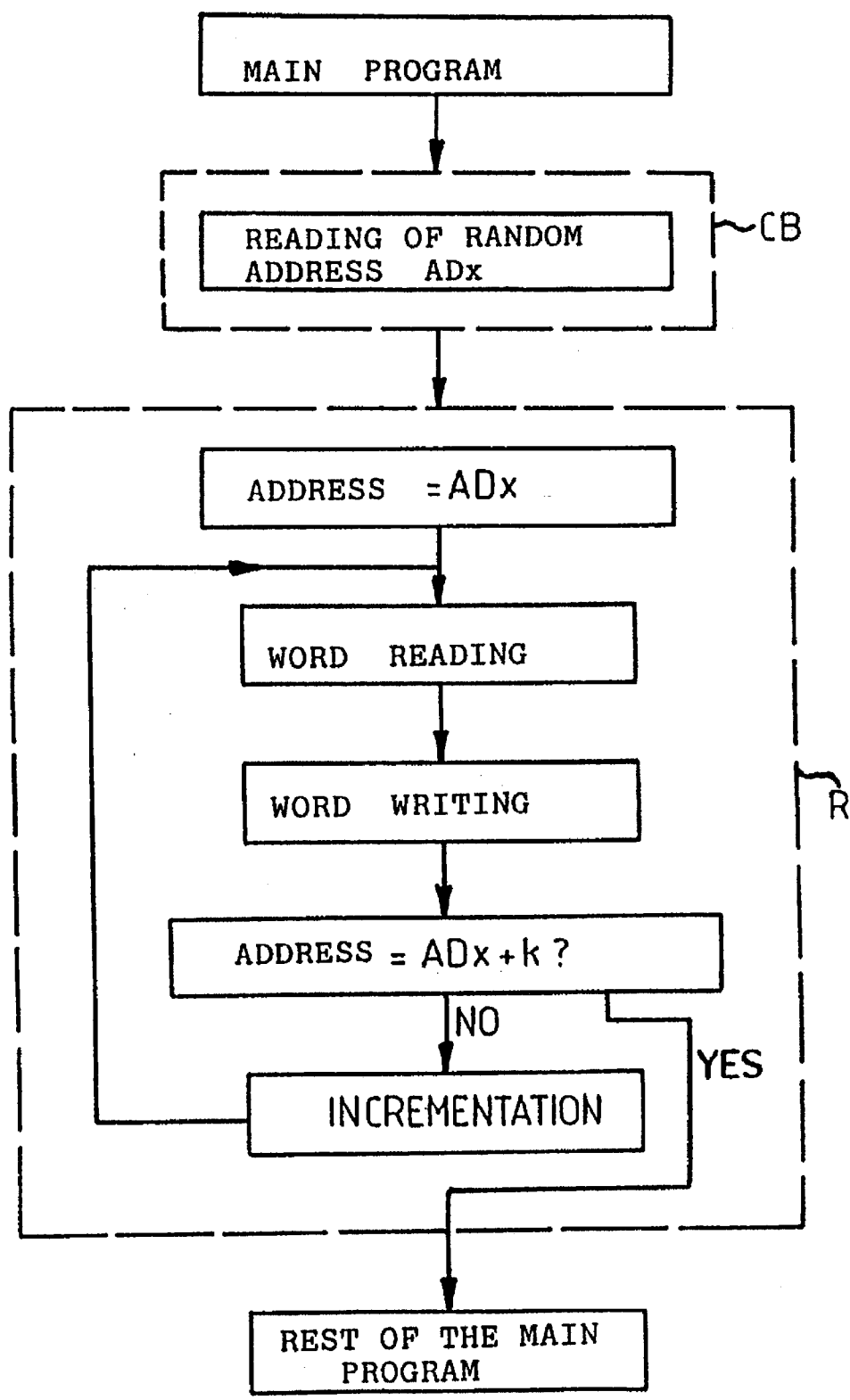

CHIP CARD WITH DATA AND PROGRAMS PROTECTED AGAINST AGEING

BACKGROUND OF THE INVENTION

The invention relates to chip cards, and especially to chip cards comprising data elements stored in electrically erasable and programmable non-volatile memories (EEPROMs).

chip cards are increasingly being provided with this type of memory in order to contain:

either data for the customizing of the card (confidential code, data to identify the authorized application or the authorized user etc.), or data that may vary during the use of the card (credit in terms of prepaid units, electronic wallet data, data on transactions etc.), or again programs that can be executed by a microprocessor placed on the same integrated circuit chip, these programs being stored in the non-volatile memory so that they are not permanently fixed at the time of manufacture.

These EEPROMs are provided on the card along with other types of memories, namely random-access memories (RAMs) or read-only memories (ROMs).

For example, the following is a frequent use of EEPROMs: a microprocessor works essentially with programs stored in a read-only memory (ROM) but certain programs, called filters and placed in an EEPROM, can be used to modify the possibilities of the programs stored in a ROM, or more generally to modify the application of the card. These programs are placed in an electrically programmable memory so that they can be written in the card by electrical programming, after manufacture, according to the needs of the application or the user.

It has been observed, however, that there is a risk that the cards constituted in this way will not be entirely satisfactory in terms of longevity.

SUMMARY OF THE INVENTION

The invention proposes mainly to place an additional program in the card to refresh the contents of certain zones of these EEPROMs, especially those containing permanent information (data elements or programs), in order to eliminate the risk of the deterioration of data during the lifetime of the card. The refresh program is preferably placed in a read-only memory (ROM) but it can also be placed in an EEPROM. The invention can be applied especially to microprocessor chip cards and, in this case, it is the microprocessor that carries out a refresh program contained in an executable memory. When there is no microprocessor, it is necessary to have a wired sequencer to carry out a refresh program.

The invention therefore proposes a chip card comprising at least one EEPROM containing at least one zone of permanent data elements, i.e. data elements that are not liable to be modified at each use of the card, wherein said chip card comprises means for the automatic refreshing of all or a part of the contents of this zone.

If the card has a microprocessor, the refresh means are constituted by a series of instructions that can be carried out by the microprocessor, these instructions being placed in a read-only memory or at least partially in the EEPROM.

The refresh program then preferably has an iterative loop with a reading of the contents of a word and then a writing of this word with the contents read, without any prior erasure of the word, and then an incrementation of a memory address to read a following word, this procedure being carried out from the start to the end of a part of the memory zone to be refreshed or from the start to the end of the entire memory zone to be refreshed.

The refresh procedure may be triggered by conditions of connection to the refresh program that are either certain dates or a certain number of uses of the card, or routinely each time that the power is turned on.

It is planned that, as the case may be, the card will have means to trigger a refresh procedure when the card is used beyond a predetermined time limit after it has been first put into operation or beyond a predetermined time limit after a previous refresh operation. Or else, it may planned that the card will comprise means to trigger a refresh procedure when the card has been used for a predetermined number of times after the first time that it is put into operation or a predetermined number of times after a previous refresh operation. Or else, it may be planned that the card will comprise means to trigger a refresh procedure each time that the card is powered but on only one part of the zone to be refreshed, the starting address of this part being obtained randomly.

BRIEF DESCRIPTION OF THE DRAWINGS

Other features and advantages of the invention shall appear from the following description, made with reference to the appended drawings, of which:

FIG. 1 shows a chip of a microprocessor chip card;

FIG. 2 shows the contents of an EEPROM of the card in symbolic form;

FIG. 3 shows an exemplary flow chart of the steps for the implementation of the invention;

FIG. 4 shows another exemplary flow chart of the steps for the implementation of the invention.

MORE DETAILED DESCRIPTION

The chip shown in FIG. 1 is a highly standard type of chip. It has a microprocessor MP, a working random-access memory (RAM), a program read-only memory (ROM) and an electrically erasable and programmable non-volatile memory (EEPROM) containing data elements and/or programs. The microprocessor and the memories are connected to each other by data and address buses which also enable communication with the exterior of the chip by means of contact pads P and, possibly, input/output interface circuits IES.

The EEPROM may contain permanent data elements as well as variable data elements. The expression "variable data elements" is understood to mean data elements that are likely to vary during successive uses of the card whereas, on the contrary and in principle, the permanent data elements or permanent programs remain unchanged from one use to another. For example, the permanent data elements are identification codes of the card, identification codes of the application in which in which it may work and, possibly, codes for the identification and authentication of the authorized users. These data elements are most usually recorded in the chip card when the card is customized, i.e. after the manufacturing and testing of the card. This is why they are recorded in an electrically programmable memory. The variable data elements are those that are recorded in the card when it is being used, that must be preserved in a non-volatile way until the next use and that must then be modified during this new use. For example, these variable data elements correspond to the credits available in the case of bank cards or prepayment cards, or the balance of an electronic wallet.

Furthermore, the information elements recorded in certain zones of the EEPROM may be instruction programs that can be executed by the microprocessor. Most of the instruction programs are contained in principle in the read-only memory (ROM), but certain programs may be in an EEPROM: these are programs or portions of programs or, again, parameters for the modification of read-only memory programs, which are specific to a particular application among several possible applications, or again specific to a particular user or group of users among other possible users. These programs are therefore recorded in the card only when it is being customized, hence in principle after the manufacture and testing of the card. They are, in principle, permanent unless the card is recustomized.

FIG. 2 shows a possible configuration of the EEPROM with a first zone Z1 containing permanent data elements (identification, authentication etc.), a second zone Z2 containing programs or portions of programs that can be executed by the microprocessor, a third zone Z3 containing non-volatile variable data elements that are generated during the use and have to be kept until the next use and, finally, possibly other EEPROM zones designated by Z4. It will be assumed that the first zone starts at a memory address AD0 (address generated by the microprocessor), that it ends at an address AD1, that the second zone starts at the immediately following address and that it ends at an address AD2.

The zones Z1 and Z2 are considered, in this example, to be zones containing "permanent" type information elements, the contents of these zones being crucial to the working of the card. These are zones that will be periodically refreshed to avoid any deterioration of their contents owing to the inevitable ageing of the EEPROM. The zone Z3 and the zone Z4 will not be refreshed.

The refreshing of the contents of the zones Z1 and Z2 is triggered by the conditions of connection CG to the refresh program which is a sub-program of the main program. The conditions of connection may include a test relating, for example, to a predetermined refresh date or to a maximum number of uses of the card. This means that it shall be assumed, in this case, for example that it is necessary to refresh the zones Z1 and Z2 every year or at the end of a hundred or a thousand uses of the card.

This test may be carried out, for example, routinely each time that the chip card is powered again. The test then constitutes a preliminary step of the procedure for putting the card into operation.

If the test is a date test, the refresh operation may be carried out routinely at certain predetermined dates. Even if the card does not itself contain an internal date, the reader in which it is inserted will generally possess this date. The microprocessor could compare this date with the predetermined dates. It will furthermore test the state of a flag bit indicating whether a refresh operation has been carried out or has not yet been carried out since the critical date. If a refresh operation has been carried out, the main program of use of the card continues. Otherwise, a refresh sub-program is carried out before the return to the main program.

If the test relates to the number of uses of the card, it is necessary to provide for the means for the recording, for example in the zone Z4 of the EEPROM, of a number N of uses, incremented by one unit each time that the card is powered once again. The incrementation of this number then constitutes one of the initial programs (in read-only memory) of the procedure for putting the card into operation at each use.

FIG. 3 gives a schematic view of the invention in the form of a flow chart of a program that can be carried out by the microprocessor. This program is stored in principle in the read-only memory ROM. However, it is also possible to envisage a case where it is partly stored in the EEPROM itself, for example in the zone Z4. The latter possibility will be used when it is desired that the refresh program should be sold as an option and not obligatorily with the chip card.

FIG. 3 shows a flow chart of operation which assumes that the refresh operation is carried out at the end of a number N0 of uses of the card after the previous refresh operation.

The main program in the read-only memory ROM is carried out and goes through a sequence of incrementation of the number N of uses of the card. The incremented number is stored in the memory Z4. Then a sequence of comparison of N with the predetermined number Nb is carried out. If N is smaller than Nb, the main program continues. If not, a connection to a refresh sub-program R is made.

The sub-program R first of all comprises a step of initialization of an address counter of the microprocessor to position the counter at the starting address AD0 of the zones Z1, Z2 to be refreshed. Then, the program goes into a loop for as long as the last address AD2 of the EEPROM zones to be refreshed has not been reached.

The loop comprises a step for the reading of a memory word at the address indicated by the address counter, then a step for the writing of this word with the contents that have just been read. The writing is preferably done without prior erasure, in order to obtain speedier operation, whereas usually the writing of a word in an EEPROM entails first of all the erasure of the word. The writing without erasure is possible since the same word is written again.

Then, there is a step designed for the testing of the address counter. If the address AD2 is reached, the program leaves the loop. If not, the address is incremented by one unit and the program returns to the reading step, with a view to reading the next word.

The exit from the loop, when the word of the last address AD2 has been rewritten, may include a zero-resetting of the number N of uses of the card memorized in the zone Z4. Then, the main program is returned to.

According to another exemplary embodiment, there may be provision for a systematic refreshing of a part of the memory zone to be refreshed, this being done whenever the card is powered for example. Indeed there is provision, in this case, for a random generator G which, upon a command from the processor MP when the power is turned on, will give a random address ADx of the addressable space of the zone to be refreshed. The diagram of FIG. 4 may be referred to for a clearer understanding of the invention.

According to the example, the conditions of connection CB include a routine reading of the address counter of the microprocessor each time that the power is turned on.

The main program in the read-only memory ROM is carried out and then goes through the sequence of reading the random address ADx generated by the generator G. A connection is made to a refresh sub-program R.

The sub-program R comprises firstly the step for the initialization of the address counter of the microprocessor to position the counter at the address ADx of the start of the part A to be refreshed.

Then, the program goes into a loop for as long as the last address ADx+k of this part A has not been reached. The value k has been memorized beforehand. This value is chosen in principle once and for all and fixes the size of the refreshed parts of the zone to be refreshed. The random sorting of an address by the generator enables the refreshing of the entire zone at the end of an appropriately chosen period.

What is claimed is:

1. A chip card comprising:

a segregated EEPROM, wherein data elements stored in the segregated EEPROM are segregated according to the frequency with which the data elements are modified, the segregated EEPROM including a permanent memory zone, the permanent memory zone comprising a first continuous sequence of addresses, the first continuous sequence of addresses comprising a substantial number of a total number of EEPROM addresses, each address of the first continuous sequence of addresses storing a data element that generally remains unmodified after each use of the chip card, and a variable memory zone, the variable memory zone comprising a second continuous sequence of addresses, each address of the second continuous sequence of addresses storing a data element that is generally modified with each use of the chip card; and means for automatically refreshing the contents of the permanent memory zone, including means for storing information which indicates the location in the segregated EEPROM of the permanent memory zone so that the automatic refresh means can refresh the permanent memory zone without having to refresh the variable memory zone.

2. A chip card according to claim 1, further comprising a microprocessor with a read-only memory, and wherein the automatic refresh means includes a series of instructions carried out by the microprocessor.

3. A chip card according to claim 2, wherein the series of instructions is stored in the read-only memory.

4. A chip card according to claim 2, wherein the series of instructions is stored at least partially in the EEPROM.

5. A chip card according to claim 2, wherein the series of instructions is a sub-program of a main application program.

6. A chip card according to claim 1, comprising means for triggering a refresh procedure when the card is used beyond one of (1) a predetermined date after the card is first put into operation and (2) a predetermined date after a previous refresh operation.

7. A chip card according to claim 1, comprising means for triggering a refresh procedure when the card has been used for one of (1) a predetermined number of times after the first time the card is first put into operation and (2) a predetermined number of times after a previous refresh operation.

8. A chip card according to claim 1, further comprising means for triggering a procedure for refreshing, each time that the card is powered, a part of the permanent memory zone to be refreshed.

9. A chip card according to claim 8, wherein the means for triggering the refresh procedure comprises a random generator generating a random address included in the addressing space of the permanent memory zone to be refreshed.

10. A chip card according to claim 9, wherein the address generated is a starting address AD(x) of the part of the permanent memory zone to be refreshed, the end address AD(x+k) of the part of the permanent memory zone to be refreshed being obtained by incrementing the starting address AD(x) by a predetermined number k.

11. A chip card comprising:

a segregated EEPROM, wherein data elements stored in the segregated EEPROM are segregated according to the frequency with which the data elements are modified, the segregated EEPROM including a permanent memory zone, the permanent memory zone comprising a first continuous sequence of addresses, the first continuous sequence of addresses comprising a substantial number of a total number of EEPROM addresses, each address of the first continuous sequence of addresses storing a data element that generally remains unmodified after each use of the chip card, and a variable memory zone, the variable memory zone comprising a second continuous sequence of addresses, each address of the second continuous sequence of addresses storing a data element that is generally modified with each use of the chip card; and means for automatically refreshing the contents of the permanent memory zone, the automatic refresh means comprising a series of instructions, and wherein the series of instructions comprises an iterative loop including a reading instruction defining means for reading of the contents of a word, a writing instruction defining means for next writing the word with the contents read, without any prior erasure of the word, and an incrementation instruction defining means for next incrementing a memory address to read a following word, the iterative loop being carried out from the start to the end of the permanent memory zone thereby refreshing substantially the entire permanent memory zone before the microprocessor returns to a main program.

12. A method of protecting data in an EEPROM of a chip card, the method comprising the steps of:

designating a memory zone of the chip card EEPROM, the designated memory zone comprising a plurality of memory addresses to be refreshed, the plurality of memory addresses to be refreshed comprising a substantial portion of a total number of memory addresses of the chip card EEPROM;

storing information which indicates the location in the chip card EEPROM of the designated memory zone;

ascertaining whether a condition precedent has occurred, and if the condition precedent has occurred, then refreshing substantially all of the plurality of addresses of the designated memory zone, the refreshing step being performed based on the stored information which indicates the location in the chip card EEPROM of the designated memory zone, and wherein undesignated memory addresses of the chip card EEPROM remain unrefreshed after the refreshing step.

13. A method according to claim 12, further comprising the step of incrementing a counter which counts a number of times the chip card has been used since one of (1) the chip card was first put into operation and (2) a previous refresh operation was performed on the chip card EEPROM, and wherein the condition precedent ascertaining step includes the step of ascertaining whether the counter equals a predetermined number.

14. A method according to claim 13, wherein the predetermined number is one hundred, so that the refreshing step is performed once every one hundred uses of the chip card.

15. A method according to claim 12, further comprising the step ascertaining an amount of elapsed time since one of (1) the chip card was first put into operation and (2) a previous refresh operation was performed on the chip card EEPROM, and wherein the condition precedent ascertaining step includes the step of ascertaining whether the amount of elapsed time exceeds a predetermined amount of time.

16. A method according to claim 15, wherein the predetermined amount of time is one year, so that the refreshing step is performed approximately once per year.

17. A method according to claim 12, wherein the refreshing step comprises the steps of:

reading the contents of a memory address of the memory zone;

writing the contents back to the memory address of the memory zone without first erasing the memory address;

incrementing an address counter to a next memory address;

repeating the reading, writing and incrementing steps until the entire memory zone has been refreshed.

18. A method according to claim 12, further comprising the steps of:

segregating the chip card EEPROM according to the frequency with which data elements are modified, the chip card EEPROM being segregated into a permanent memory zone and a variable memory zone;

storing data elements that generally remain unmodified after each use of the chip card in the permanent memory zone; and storing data elements that are generally modified with each use of the chip card in the variable memory zone;

and wherein the memory zone refreshed during the refreshing step is the permanent memory zone.

19. A method according to claim 18, wherein the undesignated addresses which remain unrefreshed after the refreshing step form the variable memory zone.

20. A method according to claim 12, wherein the refreshing step is performed during a sub-program of a main application program.

21. A method of protecting data in an EEPROM of a chip card, the method comprising the steps of:

segregating the EEPROM according to the frequency with which data elements are modified, the EEPROM being segregated into a permanent memory zone and a variable memory zone, the permanent memory zone comprising a substantial number of a total number of memory addresses of the chip card EEPROM;

storing data elements that generally remain unmodified after each use of the chip card in the permanent memory zone; and storing data elements that are generally modified with each use of the chip card in the variable memory zone; and ascertaining whether a condition precedent has occurred, and if the condition precedent has occurred, then refreshing substantially all of the plurality of addresses of the permanent memory zone, the ascertaining step comprising one of (1) the steps of incrementing a counter which counts a number of times the chip card has been used since one of (a) the chip card was first put into operation and (b) a previous refresh operation was performed on the chip card EEPROM, and ascertaining whether the counter equals a predetermined number, and (2) the steps of ascertaining an amount of elapsed time since one of (a) the chip card was first put into operation and (b) a previous refresh operation was performed on the chip card EEPROM, and ascertaining whether the amount of elapsed time exceeds a predetermined amount of time.

22. A method according to claim 21, wherein the refreshing step comprises the steps of:

reading the contents of a memory address of the permanent memory zone;

writing the contents back to the memory address of the permanent memory zone without first erasing the memory address;

incrementing an address counter to a next memory address;

repeating the reading, writing and incrementing steps until the entire permanent memory zone has been refreshed.

23. A method according to claim 22, wherein the refreshing step is performed during a sub-program of a main application program.

* * * * *